Figure 1:
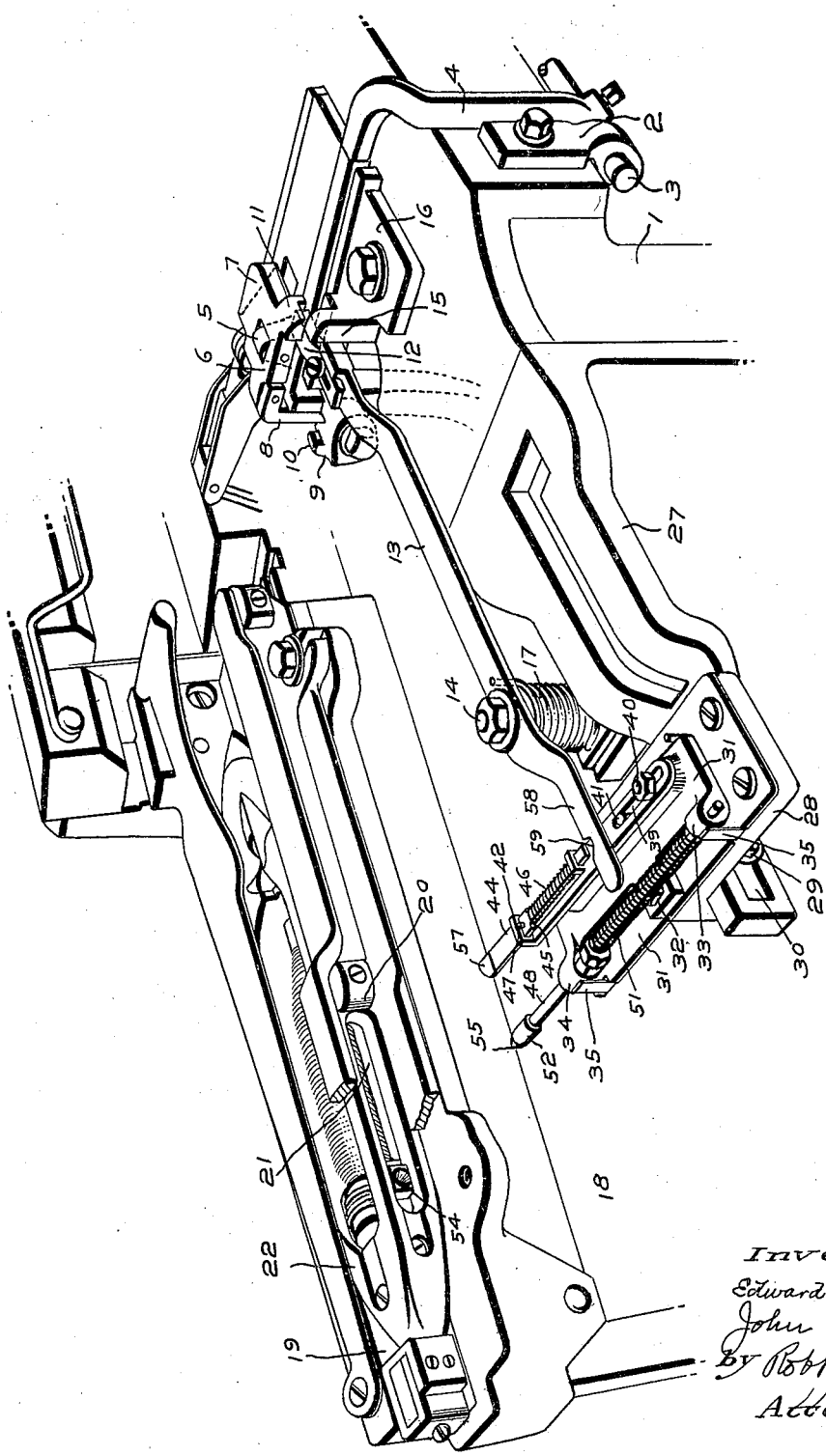

E. A. AND J. V. CUNNIFF.
FEELER MECHANISM FOR LOOMS.
APPLICATION FILED MAY 8, 1920.

1,392,817.

Patented Oct. 4, 1921.
2 SHEETS—SHEET 1.

Inventor:
Edward A. Cunniff
John V. Cunniff
By Robt P. Hains
Attorney

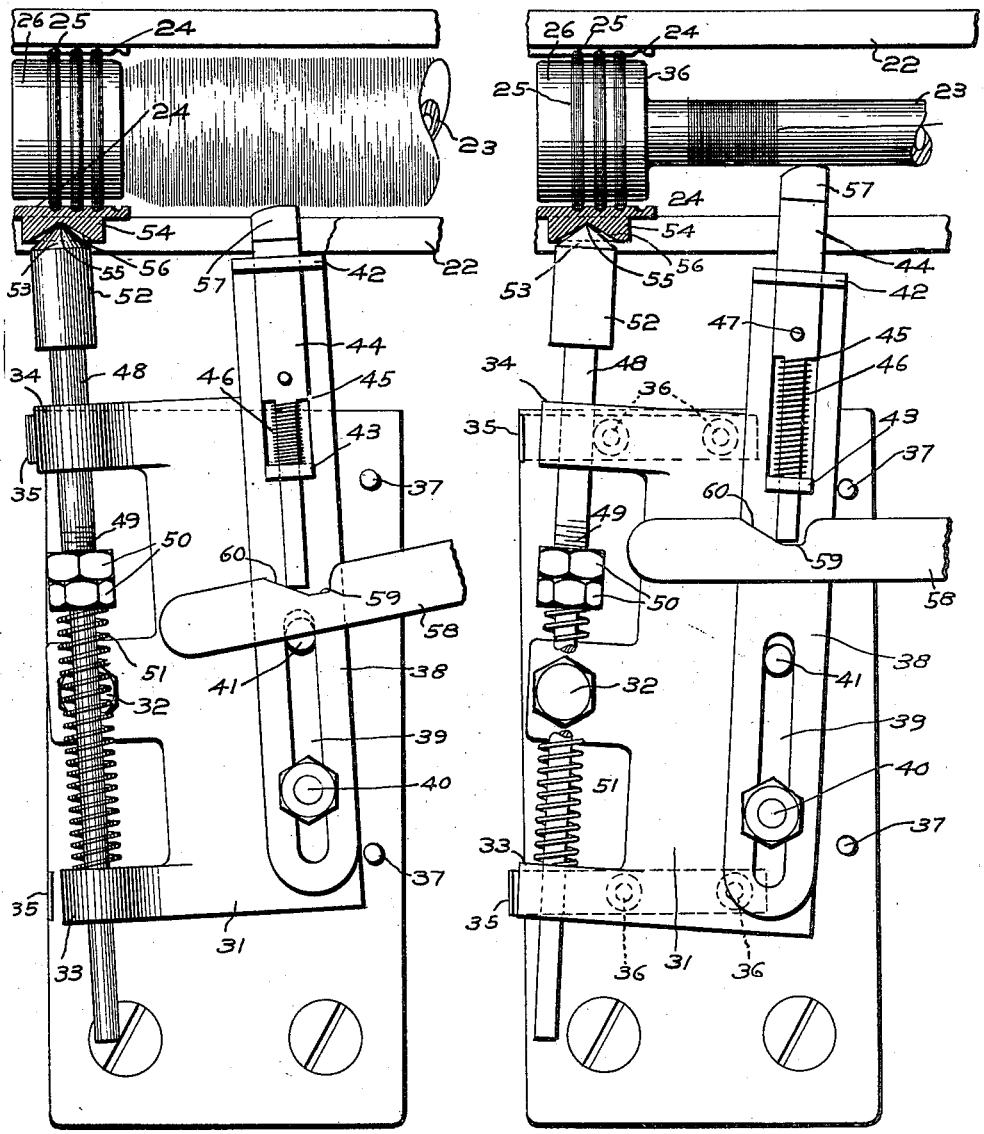

UNITED STATES PATENT OFFICE.

EDWARD A. CUNNIFF AND JOHN V. CUNNIFF, OF FALL RIVER, MASSACHUSETTS, ASSIGNORS TO DRAPER CORPORATION, OF HOPEDALE, MASSACHUSETTS, A CORPORATION OF MAINE.

FEELER MECHANISM FOR LOOMS.

1,392,817.  Specification of Letters Patent.  Patented Oct. 4, 1921.

Application filed May 8, 1920. Serial No. 379,786.

*To all whom it may concern:*

Be it known that we, EDWARD A. CUNNIFF and JOHN V. CUNNIFF, citizens of the United States, residing at Fall River, in the county of Bristol and State of Massachusetts, have invented an Improvement in Feeler Mechanisms for Looms, of which the following description, in connection with the accompanying drawings, is a specification, like characters on the drawings representing like parts.

This invention relates to feeler mechanisms for looms, through the agency of which replenishment of filling is effected when that in the active shuttle becomes substantially exhausted.

Mechanisms of this general character, as now constructed, embody a feeler which feels through a slot in the side wall of the shuttle on a detecting beat to determine the condition of filling within the shuttle. Should the shuttle not be properly boxed on a detecting beat, however, the feeler may not enter the slot in the side wall of the shuttle, but may be engaged by the shuttle itself and fail to perform its detecting function. The shuttle may come to rest in the detecting box either after a rebound, or it may fail to fully enter the box owing to various causes. In such event, it is desirable that the feeler still continue the discharge of its feeling function, notwithstanding the shuttle is improperly boxed.

An important feature of the present invention, therefore, consists in a detector mechanism comprising a feeler and a feeler detector which will ascertain when the shuttle is improperly boxed, and will cause the feeler to be positioned to enter the shuttle, notwithstanding the improper position of the shuttle. In carrying this feature of the invention into effect, the feeler mechanism comprises a shuttle detector and a detector bunter which is carried by the shuttle and which engages the shuttle detector as the lay moves frontwardly on a detecting beat, the construction being such that should the shuttle be improperly boxed, the bunter will act through the detector to move the feeler into a position to enter the shuttle and ascertain the condition of the filling. The movement of the feeler is preferably about an axis which permits swinging movement of the feeler in a direction longitudinally of the shuttle under the dictates of the shuttle detector when the shuttle is improperly boxed.

As the lay makes its detecting beat-up movement, the construction and arrangement of the detector and the detector bunter is such that they engage before the feeler is called upon to perform its feeling function so that should the shuttle be improperly boxed, the shuttle detector will determine this fact and through coöperative relation with the detector bunter, will move the feeler into a position to enter the slot in the side of the shuttle and feel for the filling.

The above features of the invention, together with other novel elements and combinations of parts, will hereinafter be described in connection with the accompanying drawings which embody a good, practical form of the invention.

In the drawings:—

Figure 1 is a perspective view of the feeler side of the loom, showing more particularly the feeler mechanism and shuttle-box at that side of the loom;

Fig. 2 is an enlarged plan view, some of the parts being in section, and showing the action of the detector in positioning the feeler when the shuttle is improperly boxed in one direction; and Fig. 3 is a view similar to that of Fig. 2, showing the position of parts when the detector finds the shuttle improperly boxed in the opposite direction, and also indicating the call for replenishment by the feeler.

The loom frame 1 has mounted thereon the brackets 2, one at each side of the loom, in which is supported the transverse or rock shaft 3. Rising from the rock shaft 3 is the arm 4 which, when replenishment is to be effected, is adapted to be held frontwardly to turn the rock shaft as usual in this general type of loom, and call into action the replenishing mechanism. In the present instance of the invention, the arm 4 has rising therefrom the lug 5 to which is pivoted at 6 the weighted lever 7 having depending therefrom the finger 8. Connected to or formed as part of the cam follower is the operating member 9, a lug 10 of which is adapted to engage the finger 8 and move the arm 4 frontwardly when filling is to be changed. The front end portion 11 of the weighted lever 7 overlies the end 12 of a transmitter 13 pivoted at 14 to a suitable support connected with the loom frame, and a stop 15 rising from the bracket 16 secured to the loom frame limits the frontward movement of the end 12 of the transmitter under the impulse of the spring 17 preferably surrounding the pivotal axis 14 of the transmitter, as best indicated in Fig. 1. The construction as such that should the end 12 of the transmitter fail to be moved rearwardly on a detecting beat, the finger 8 would remain in position to be engaged by the lug 10 of the operating member and cause replenishment of filling. The construction so far described is of usual type, and being well understood, further amplification thereof at this time is unnecessary.

The lay 18 may be of the usual construction and have thereon the shuttle-box 19, the front wall of which may be slotted at 20, as usual, to register with an opening 21 formed in the side wall of the shuttle 22 when the shuttle is in approximately proper boxed position in the shuttle-box. The shuttle 22 carries the bobbin 23 which may be held in the shuttle by the usual metal jaws 24 which engage rings 25 formed on the base or head 26 of the bobbin, the construction being as usual in this general type of loom, so that upon call for replenishment, the bobbin 23 then in the shuttle may be ejected and another may be substituted therefor when the shuttle is at the replenishing side of the loom.

In the present invention, the feeler is mounted to enter the slotted front walls of the shuttle-box and shuttle and ascertain the condition of filling; and to effect replenishment of filling when that in the shuttle has reached a condition of substantial exhaustion, but prior to complete exhaustion. The feeler may be of any usual character common in looms of this type, but in the present instance it is of a character to measure the amount of filling in the shuttle on each detecting beat; and when the measured quantity reaches a predetermined minimum, the construction is such that the feeler will call for a change of filling.

Extending from the loom frame is the shipper stand 27, to which is adjustably connected the support 28 for sustaining the feeler mechanism. The support 28 may be conveniently formed as a bracket and be adjustably secured to the end portion of the shipper stand by a bolt 29 and slot 30, the construction being such that the feeler mechanism may be adjusted transversely.

Pivotally mounted upon the support 28 is the feeler stand 31. The feeler stand 31 is preferably formed as a plate pivoted at 32 to the support 28. The feeler stand 31 has the front and rear lugs or projections 33 and 34 against which bear the upwardly-extending end portions of springs 35 which may be secured to the support 28 in any convenient manner to normally maintain the feeler stand 31 in its normal or central position, as will more fully appear. In the present instance, the springs 35, one at the front portion and the other at the rear portion of the feeler carrier, are secured to the support 28 by suitable pins or bolts 36, as best indicated in Fig. 3. These form a convenient means for securing the springs in position, but it will be clearly evident that various forms of means may be provided for locating the springs 35 to perform their spring action upon the lugs 33 and 34 of the feeler.

The feeler stand 31 being pivoted at 32 to the support 28, the springs 35 will hold the feeler stand in its central or normal position, but permit it to swing about its pivotal axis 32. Stop pins 37 rising from the support 28 may limit the swinging movement of the feeler stand.

Secured to the feeler stand 31 is the usual feeler carrier 38. In the present instance the carrier 38 is slotted at 39 and through this slot passes the securing bolt 40 and a guide pin 41, the construction being such that the feeler carrier 38 may be secured to the feeler stand for adjustment toward and from the front of the loom. Rising from the feeler carrier 38 is the rear flange 42 and the front flange 43 provided with openings respectively, through which extends the feeler 44. The feeler may be variously constructed, but in the present instance it has a shouldered portion 45 between which and the bearing 43 is interposed a spring 46 which normally holds the feeler 44 in its rearward position with a stop 47 bearing against the rear flange 42, the construction being such that upon the beat-up movement of the lay, the feeler 44 may be moved frontwardly on the feeler carrier 38 against the stress of the spring 46.

The feeler stand 31 has mounted thereon the shuttle detector which, in the present instance, comprises the rod 48 which is mounted for movement toward and from the front of the loom in the lugs 34 and 35 extending from the feeler stand. The rod 48 is threaded at 49 to receive the adjustable nuts 50. A spring 51 interposed between the nut 50 and the lug 33 normally tends to hold the shuttle detector 48 in its rearward position with one of the nuts 50 bearing against the rear lug 34.

The shuttle detector 48 has an engaging head 52, the rear end portion of which is provided with an incline surface 53 which is adapted to coöperate on a detecting beat with a detector bunter 54 carried by the shuttle. The engaging surface of the detector bunter is inclined as indicated in Figs. 3 and 4, the construction being such that should the inclined surface 53 of the shuttle detector engage the inclined surface of the detector bunter, on a detecting beat, the two inclined surfaces will tend to move into a central registering position, as indicated in Figs. 3 and 4; and should the shuttle be improperly boxed at such times, the shuttle detector will move the feeler stand 31 on its pivotal support and swing the feeler in one direction or the other to position its end for entrance through the slotted wall of the shuttle-box and shuttle.

It has been found preferable to form the end of the shuttle detector with an engaging part 55, and to form the detector bunter with an inwardly-inclined surface 56, the construction being such that should the end 55 of the shuttle detector meet the surface 56 of the detector bunter, one side or the other of its central depressed portion, the end of the shuttle detector will ride downward along the inclined surface of the inclined bunter until it seats itself centrally thereof, as indicated in Figs. 2 and 3. A convenient form of inclined surface on the end of the shuttle detector may be produced by forming the end of the shuttle detector conical, and similarly, the inclined surface 56 on the detector bunter may be formed by a conical depression such that when the two opposed conical surfaces are brought into engagement, they will tend to center the shuttle detector at the lower part of the conical recess in the detector bunter and cause lateral force to be applied to the end of the shuttle detector sufficient to move the feeler stand 31 about its pivotal axis against the tension of one of the springs 35.

The detector bunter 54 may be variously contrived and secured to the shuttle, but it has been found in practice that it may be conveniently formed on one of the bobbin-holding jaws 24, as indicated in Figs. 2 and 3, but of course it will be understood that it may be secured directly to the wall of the shuttle or any other suitable part of the shuttle, the essentials in this respect being that when the lay beats up on a detecting beat, the end of the shuttle detector and the incline surface of the detector bunter may be engaged.

The support 28 is adjusted on the loom frame or shipper stand, as hereinbefore described, so that when the shuttle is properly boxed on a detecting beat, the detector bunter 54 will centrally engage the pointed end 55 of the shuttle detector prior to the feeling function of the feeler, and then the feeler will feel for the filling and the parts will remain undisturbed with the feeler stand 31 centrally positioned by its springs 35. If, however, the shuttle should be improperly boxed on a detecting beat, then the end of the shuttle detector will engage the inclined surface of the detector bunter at one or the other side of its center, and, under the frontward pressure against the shuttle detector, the latter and perforce, the connected feeler stand 31, will be moved to position the feeler for entrance through the openings of the shuttle-box and shuttle.

On each detecting beat, when a working supply of filling is present in the shuttle, the end 57 of the feeler 44 will engage the filling and the feeler will be moved frontwardly. The transmitter 13 has the arm 58 provided with a recess 59 into which the front end of the feeler extends and against which it engages when the feeler is in its central position and the shuttle is properly boxed on a detecting beat. When a working supply of filling is present, the arm 58 of the transmitter 13 will be moved frontwardly to carry the end 12 of the transmitter from under the lug 11 of the weighted lever 7, thereby permitting the finger 8 to move out of the path of the operating member. To maintain the same characteristic movement of the transmitter, notwithstanding the different inclined positions to which the feeler may be moved by the shuttle detector, owing to the improper position of the shuttle in the shuttle-box, the recess in the arm 58 of the transmitter is formed with the inclined surface 60 adapted to impart to the transmitter movement to carry the end 12 thereof from under the lug 11 when, on a detecting beat, a working supply of filling is present in the shuttle. When, however, the filling has become substantially exhausted as indicated in Fig. 3, the frontward movement of the feeler will no longer be sufficient in extent to carry the end 12 of the transmitter from under the lug 11 and the operating member will therefore engage the finger 8 and rock the transverse or rock shaft 3 to effect replenishment of filling.

What is claimed is:—

1. In a feeler mechanism for looms, the combination of a feeler that is mounted to enter the side of a shuttle and feel for the filling, a detector bunter carried by the shuttle, a shuttle detector mounted to be engaged by the bunter on a detecting beat of the lay and to be displaced laterally by the bunter when the shuttle is not properly boxed, and means for moving the feeler laterally when the shuttle detector is moved laterally.

2. In a feeler mechanism for looms, the combination of a feeler mounted to feel for the filling in the shuttle on a detecting beat of the lay, a shuttle detector connected to the feeler, a detector bunter carried by the shuttle and having a surface to engage and cause lateral movement of the shuttle detector by the frontward pressure upon it when the shuttle is not properly boxed on a detecting beat.

3. In a feeler mechanism for looms, the combination of a feeler to enter the shuttle and feel for the filling on each detecting beat, a shuttle detector constructed and arranged to engage the shuttle on every detecting beat due to frontward movement of the lay, and connections between the feeler and shuttle detector to effect movement of the feeler to a position to enter the shuttle and feel for the filling when the shuttle detector finds the shuttle misplaced in the shuttle-box.

4. In a feeler mechanism for looms, the combination of a feeler, a shuttle detector, and a detector bunter carried by the shuttle to engage the shuttle detector on a detecting beat, the engaging surface of the bunter acting by frontward pressure to move the shuttle detector in a direction transversely of the loom when the shuttle is not properly boxed, and connections between the shuttle detector and feeler to effect movement of the feeler transversely of the loom by similar movement of the shuttle detector.

5. In a feeler mechanism for looms, the combination of a feeler and a shuttle detector mounted for swinging movement about a common axis, a detector bunter carried by the shuttle to engage the shuttle detector on each detecting beat and effect swinging movement of the shuttle detector when the shuttle is not properly boxed, and connections between the detector and feeler for swinging the feeler about the common axis when the shuttle is not properly boxed.

6. In a feeler mechanism for looms, the combination of a feeler stand mounted for swinging movement in a plane transversely of the loom, a feeler and a shuttle detector mounted on the feeler stand, and a detector bunter carried by the shuttle to engage the shuttle detector on a detecting beat and effect swinging movement of the feeler stand and with it the feeler when the shuttle is not properly boxed.

7. In a feeler mechanism for looms, the combination of a feeler to enter the shuttle and feel for the filling on a detecting beat, a shuttle detector which engages the shuttle on each detecting beat due to frontward movement of the lay and is displaced laterally by the frontward pressure when the shuttle is not properly boxed, and connections between the feeler and detector for changing the inclination of the feeler relative to the longitudinal axis of the shuttle when the detector is moved laterally.

8. In a feeler mechanism for looms, the combination of a feeler, a shuttle detector, and a detector bunter carried by the shuttle and having an inclined surface adapted to engage the shuttle detector as the lay beats up to move the shuttle detector laterally by the frontward pressure of the inclined surface when the shuttle is not properly boxed, and connections between the shuttle detector and feeler to effect lateral movement of the feeler when the shuttle detector is moved laterally.

9. In a feeler mechanism for looms, the combination of a feeler stand pivotally supported for swinging movement laterally, a feeler and a shuttle detector mounted on the feeler stand, a detector bunter carried by the shuttle to engage the shuttle detector on a detecting beat and by frontward pressure against it cause swinging movement of the feeler stand and feeler when the shuttle is not properly boxed to position the feeler to enter the shuttle.

10. In a feeler mechanism for looms, the combination of a feeler, a shuttle detector, and a detector bunter carried by the shuttle and having a depressed engaging surface to effect lateral movement of the detector by the frontward pressure when the shuttle fails to be properly boxed on a detecting beat, and connections between the detector and feeler for effecting lateral movement of the feeler when the detector is moved laterally.

11. A feeler mechanism for looms, comprising, in combination, a feeler stand pivotally supported for lateral swinging movement, a feeler and a shuttle detector mounted on the feeler stand for movement with the stand, yielding means normally acting to hold the feeler stand in a predetermined position, and a detector bunter carried by the shuttle to engage and laterally displace the shuttle detector feeler and feeler stand by the frontward pressure on a detecting beat when the shuttle is not properly boxed.

12. In a feeler mechanism for looms, the combination of a shuttle having a detector bunter a feeler to enter the shuttle and feel for the filling on each detecting beat of the lay, a shuttle detector mounted at one side of the feeler and constructed and arranged to engage the detector bunter on every detecting beat due to frontward movement of the lay, and connections between the feeler and shuttle detector to effect movement of the feeler to a position to enter the shuttle when the shuttle detector finds the shuttle misplaced in the shuttle-box.

In testimony whereof, we have signed our names to this specification.

EDWARD A. CUNNIFF.
JOHN V. CUNNIFF.